Figure 4:
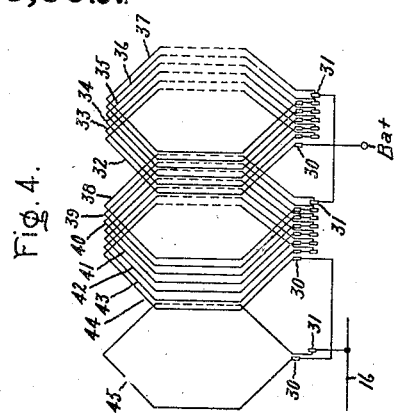

E. F. W. ALEXANDERSON.
MULTISPEED ALTERNATING CURRENT MOTOR.
APPLICATION FILED DEC. 17, 1915.
1,263,992.
Patented Apr. 23, 1918.
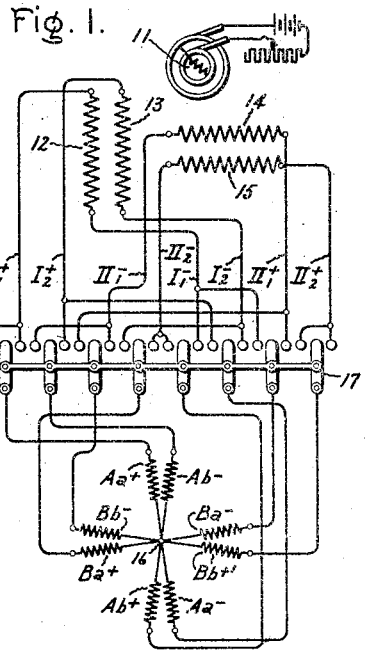
Fig. 1.
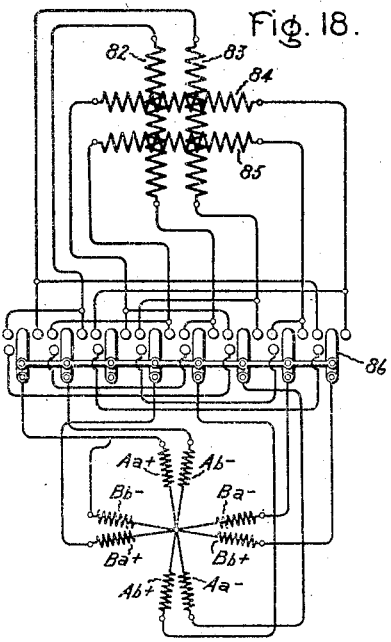
Fig. 18.
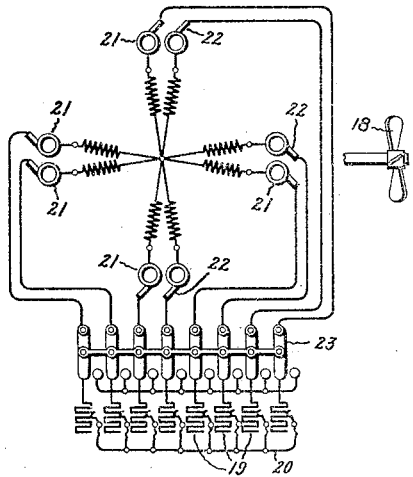
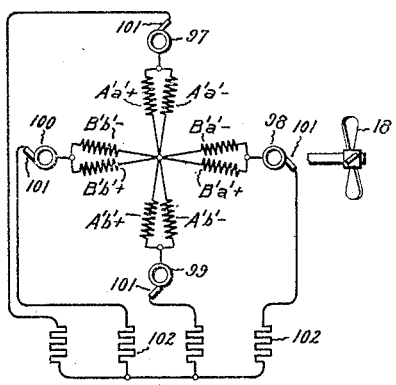
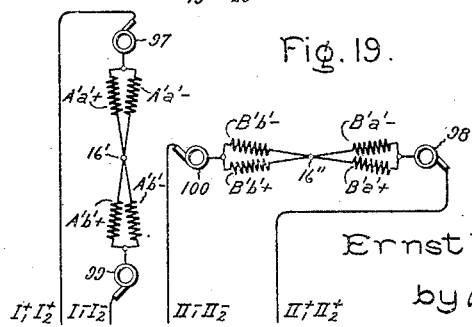
Fig. 19.
Inventor:
Ernst F. W. Alexanderson,
by His Attorney.

E. F. W. ALEXANDERSON.
MULTISPEED ALTERNATING CURRENT MOTOR.
APPLICATION FILED DEC. 17, 1915.

1,263,992.

Patented Apr. 23, 1918.
5 SHEETS—SHEET 2.

Inventor:
Ernst F. W. Alexanderson,
by
His Attorney.

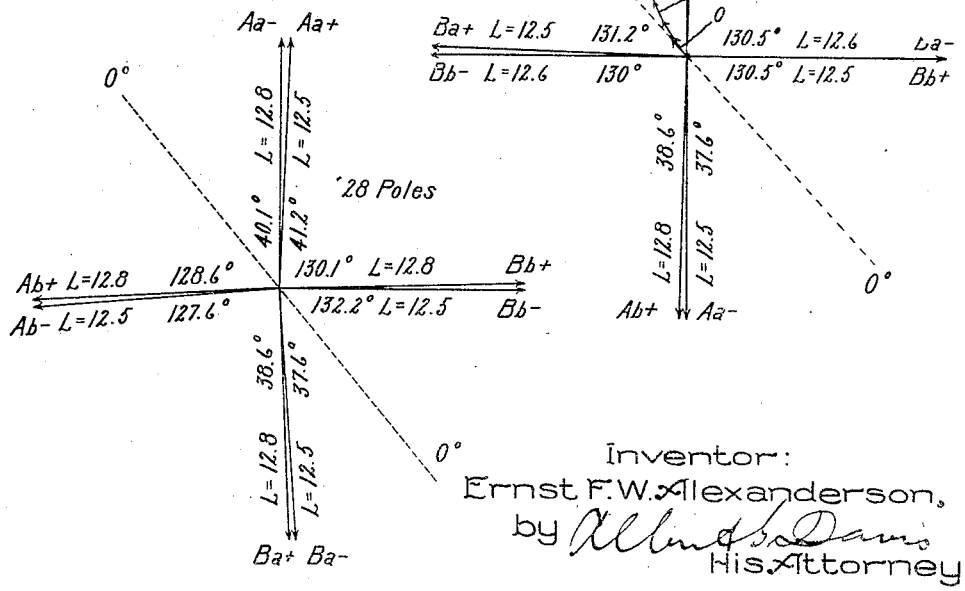

E. F. W. ALEXANDERSON.
MULTISPEED ALTERNATING CURRENT MOTOR.
APPLICATION FILED DEC. 17, 1915.
1,263,992.
Patented Apr. 23, 1918.
5 SHEETS—SHEET 4.
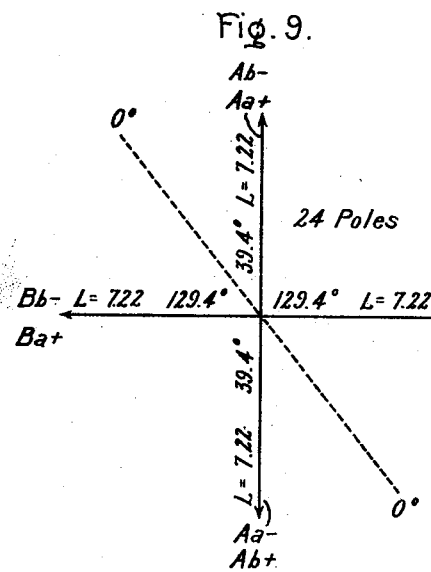
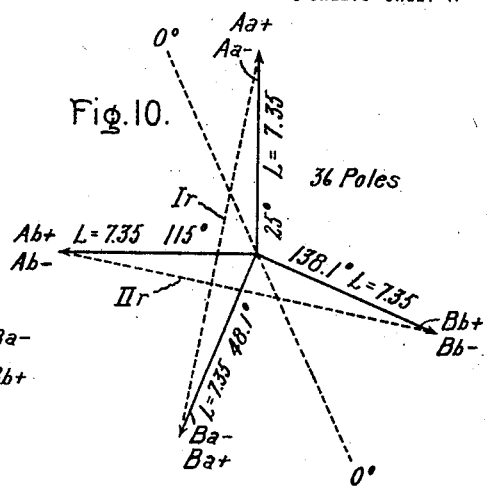
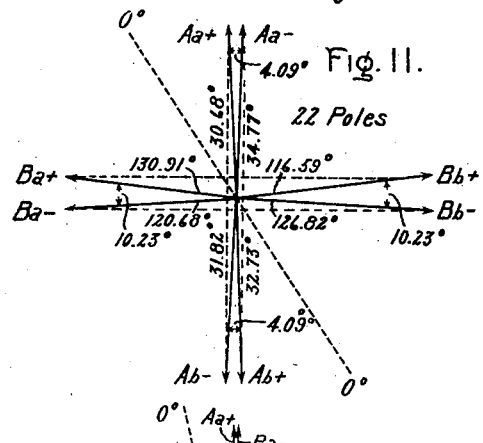
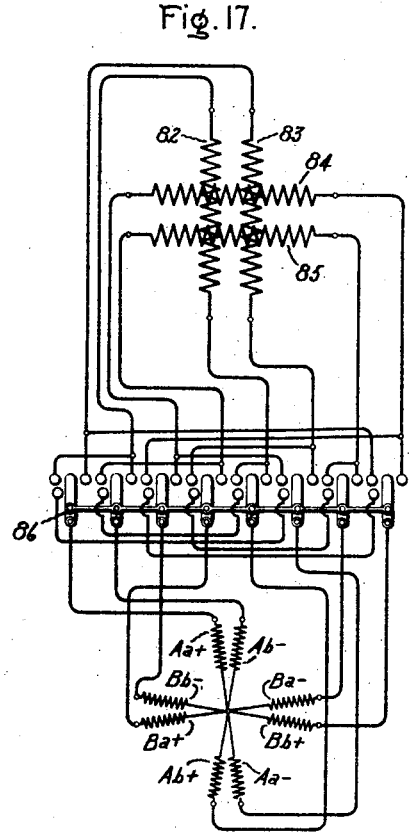
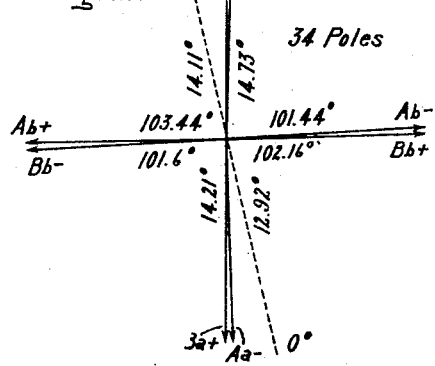
Inventor:
Ernst F. W. Alexanderson,
by
His Attorney.

E. F. W. ALEXANDERSON.
MULTISPEED ALTERNATING CURRENT MOTOR.
APPLICATION FILED DEC. 17, 1915.

1,263,992.

Patented Apr. 23, 1918.
5 SHEETS—SHEET 5.

Inventor:
Ernst F. W. Alexanderson,
by Albert G. Davis
His Attorney

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

MULTISPEED ALTERNATING-CURRENT MOTOR.

1,263,992.   Specification of Letters Patent.   Patented Apr. 23, 1918.

Application filed December 17, 1915. Serial No. 67,387.

*To all whom it may concern:*

Be it known that I, ERNST F. W. ALEXANDERSON, a citizen of the United States, residing at Schenectady, in the county of Schenectady, State of New York, have invented certain new and useful Improvements in Multispeed Alternating-Current Motors, of which the following is a specification.

My invention relates to multi-speed alternating current motors, and in particular to induction motors in which a plurality of different speeds are obtained by connecting or arranging the conductors or coils of the primary winding so as to produce primary magnetic fields of different pole numbers. The synchronous speed of an induction motor when supplied with alternating current energy of a particular frequency is determined by the number of its primary magnetic poles, the greater the number of poles the lower being the speed. Multi-speed induction motors in which different speeds are obtained by connecting or arranging the primary winding to produce primary magnetic fields of different pole numbers are well known in the art, and the object of my present invention is, broadly, to improve motors of this type, and particularly to provide a novel and improved multi-speed induction motor whose primary winding can be more simply and conveniently changed from one pole number to a different pole number than in any other similar motor with which I am acquainted.

My prior Patent No. 841,609, dated January 15, 1907, describes, broadly, a type of primary winding for an induction motor which can be arranged in accordance with the principle described in the patent to produce primary magnetic fields of a plurality of different pole numbers. The principle of this patent is generic in its scope and is capable of general application for providing any desired speed ratios with alternating current of any number of phases. In Patent No. 841,610, dated January 15, 1907, I have applied the principle of my first mentioned patent to the method of providing an induction motor with two numbers of primary magnetic poles using only one primary winding which is as efficient for each number of poles as if the same winding had been designed for that number of poles only. One of the difficulties, for which a solution has been given in Patent 841,610, refers particularly to those cases where the ratio of the number of poles is such that a number of slots that would be divisible by the number of poles and phases in each case would not be economical from the point of view of design. The patent shows how an arbitrary number of slots can be selected with reference to economy of design only, and a primary winding placed in these slots connected for any desired number of poles. The patent further shows a method by which such a winding is worked out systematically, and shows that a two-speed quarter-phase winding when worked out in accordance with this method must be divided into eight independent circuits which can be combined by the method indicated so as to give the one number of poles or the other. These eight circuits when entirely disconnected from each other must obviously have 16 terminals, and one of the objects of the present invention is to reduce the number of terminals required for the purpose of simplifying the control connections.

Where it is desired to build an induction motor for two speeds with an arbitrary ratio of primary pole numbers, it has been found most expedient to use quarter-phase connections because the motor winding can thereby be greatly simplified. In my former Patent 841,610 the primary winding of the motor is designed to be T-connected for both pole numbers and to be supplied with three phase currents. By employing the T-connection the number of phases inside the motor is reduced from 3 to 2 so that in splitting up the coils into their proper circuits the number of necessary circuits is reduced. The motor thus has in effect a quarter-phase winding, and, as previously mentioned, the groups of coils or independent circuits can thus be reduced to eight. With this motor fifteen single-pole, double-throw switches are required to make the changes of connections from one pole number to the other. I have heretofore discovered that the greatest simplicity of connections can be obtained by using a 180° quarter-phase winding. With such a winding I have found that two speeds can be obtained with four single-pole double-throw switches and three speeds with six single-pole double-throw switches. It is generally desirable to use a 90° quarter-phase winding instead of a 180° winding on account of the greater output and efficiency that can be obtained, although the control is necessarily more complicated. Certain features of my present invention relate particularly to a 90° quarter-phase primary winding for a multi-speed induction motor, and my invention in this connection aims to reduce the number of connections heretofore necessary for changing the primary winding from one number of poles to another. While my invention relates particularly to quarter-phase systems and I shall herein specifically describe and illustrate the invention as applied to such systems, it will be readily understood by those skilled in the art that the broad principles of the invention are equally applicable to any polyphase system.

The primary winding of a quarter-phase motor embodying the principles of my aforementioned patents has eight independent and electrically insulated circuits so that the winding as a whole has sixteen terminals. I have discovered that one terminal of each independent circuit of the primary winding of such a motor can be connected to a common neutral and that the remaining eight free terminals of the eight circuits can then be so connected to a suitable source of quarter-phase electric energy as to produce either of two predetermined pole numbers. By thus connecting each circuit to a neutral, I halve the number of necessary terminals of the primary winding and thereby greatly simplify the control connections. My invention in its broad aspects comprises an induction motor having a primary winding, or a secondary winding, or both, consisting of a plurality of circuits, each of which contains those coils or conductors which carry current relatively in the same way when the primary winding is connected for either number of poles and each of which has one of its terminals connected to a common neutral so that the winding has only as many free terminals as it has circuits. As applied to a quarter-phase motor, my invention consists in arranging the coils or conductors of the primary winding in eight circuits, each of which contains those coils or conductors which carry current relatively in the same way when the primary winding is connected for either number of poles and connecting one terminal of each of the eight circuits to a common neutral, so that the winding has only eight free terminals, whereby the change of connections from one pole number to the other can be effected by six single-pole double-throw switches, as will be clearly understood from the following explanations. Diagrammatically, my improved arrangement of the eight circuits of the primary winding of a quarter-phase motor resembles an eight-pointed star. The arrangement of the eight circuits is such that a 90° winding is maintained for both pole numbers, and the efficiency and mode of operation are exactly the same as in the eight-circuit winding of my prior patent having sixteen terminals and employing fifteen single-pole double-throw switches for effecting the change of connections from one pole number to the other.

The secondary winding of my improved motor, as hereinbefore intimated, may be wound and arranged as a counterpart of the primary winding with one terminal of each of its independent circuits similarly connected to a common neutral. Such a secondary winding has the same number of free terminals as the corresponding primary winding and these free terminals may of course be connected to slip rings and thence to any suitable resistance. I have further found that the circuits of the primary winding may be considered in groups, of which the conductors or coils of the circuits of each group carry current of relatively the same phase for either pole number of the primary winding, and from this relation I have discovered a very valuable and advantageous connection of the free terminals of the circuits of the secondary winding whereby the circuits of each group are connected in parallel relation for one pole number of the primary winding and in series relation for the other pole number thereof. By this improved connection of the secondary winding I am able to reduce the number of slip rings, as for example, in a quarter-phase motor to four, and these slip rings may be permanently connected to a suitable resistance, in which case the secondary current will be forced to flow through the resistance for one pole number of the primary winding and will have a short-circuited path through the secondary winding alone for the other pole number of the primary winding. All the secondary winding circuits need not be connected to the same neutral, but the secondary winding may have a plurality of neutrals thereby providing independent groups of circuits per phase from which polyphase electric energy may be taken and delivered to a starting or torque-accentuating resistance or delivered to the primary winding of a concatenated induction motor.

The primary winding of the improved motor of my present invention requires, as a general proposition, a source of electric energy having special characteristics. That is to say, in order to prevent the flow of cross currents in the primary winding due to the difference in voltage of the circuits having their free terminals of the same relative polarity connected to the same phase, it is necessary for certain pole numbers to have a source of electric energy having as many independent circuits as the primary winding has pairs of free terminals. I accordingly consider as a part of my present invention this combination of my improved motor with a specific type of electric energy supply which is necessary for certain embodiments of the invention and applicable to all. I have further discovered other advantageous combinations of my improved motor with particular types of electric energy supply which will be described in detail hereinafter and which I aim to cover in the appended claims. Thus, my present invention includes in addition to the provision of an improved multi-speed induction motor the provision of novel combinations or systems of apparatus in which this motor is an element.

The novel features of my invention which I believe to be patentable are definitely indicated in the appended claims. The principle of the invention together with certain embodiments and applications thereof will be better understood from the following description taken in connection with the accompanying drawings, in which:—

Figure 2:
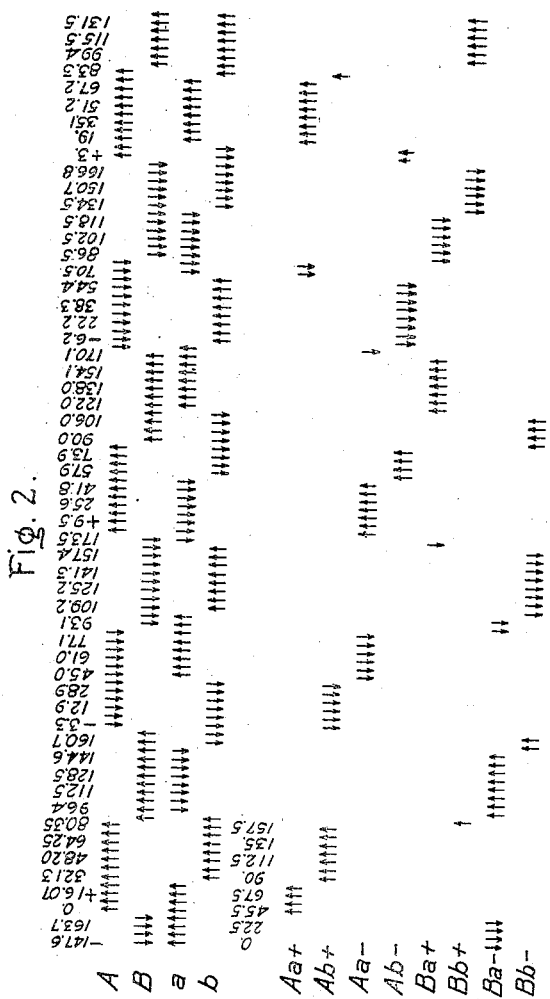
Figure 3:
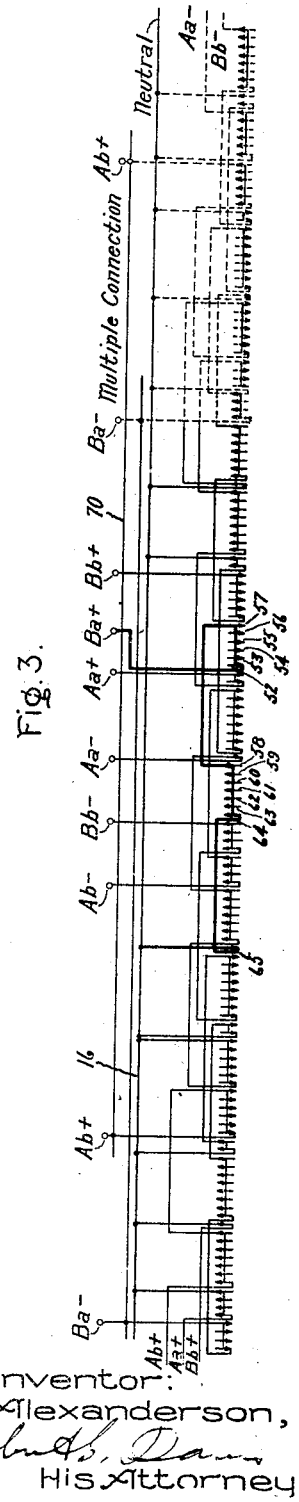
Figure 5:
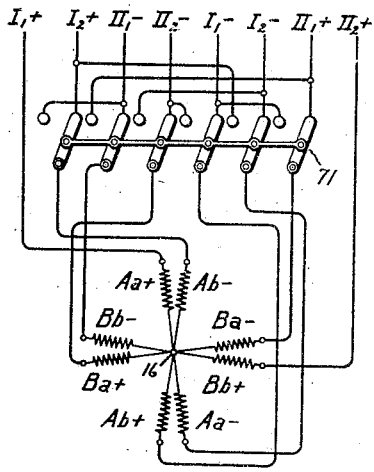
Figure 6:
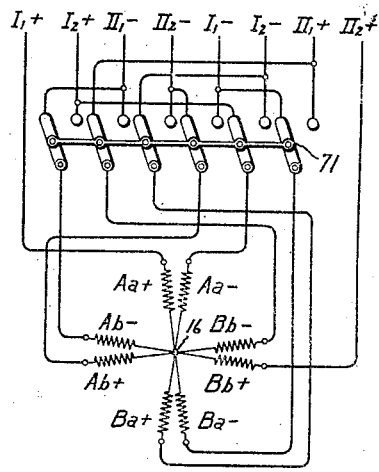

Figure 1 is a diagrammatic illustration of the invention applied to an electric system of ship propulsion; Figs. 2, 3, and 4 are explanatory diagrams illustrating the method of laying-out a winding embodying my present invention; Figs. 5 and 6 are diagrammatic views illustrating the use of a six-pole double-throw pole-changing switch with my improved motor; Figs. 7, 8, 9, 10, 11 and 12 are vector diagrams showing the magnitude and phase relations of the voltages of the eight circuits of the primary winding for different speed ratios; Figs. 13, 14, 15, 16, and 17 are diagrammatic views illustrating certain advantageous combinations of my improved motor with particular types of electric energy supply; Fig. 18 is a diagrammatic view of a motor having a primary winding and source of electric energy of the character illustrated in Fig. 17 and a modified connection of the secondary winding of particular advantage in electric ship propulsion; and Fig. 19 is a modification of the secondary winding connection illustrated in Fig. 18.

Multi-speed induction motors embodying my present invention are particularly adapted for driving the propellers in a system of electric ship propulsion. Such a system usually comprises a high speed elastic fluid turbine driving an electric generator which supplies energy to electric motors directly connected to the propeller shafts. Steam turbines are most efficient at high speeds, while a ship's propellers are most efficient at low or medium speeds. The electric generator and propeller-driving motors thus perform the function of an electric speed reducing gearing or apparatus between the turbine and the propellers, so that each may operate at their respective efficient speeds. For a great many classes of service two speed ratios of the speed reducing apparatus between the turbine and the propellers are sufficient, and where alternating current generators and propeller-driving induction motors are used these two speed ratios can be most conveniently obtained by changing the number of primary magnetic poles of the propeller-driving motors. While I have mentioned and shall hereinafter specifically describe the use of my improved multi-speed induction motor for driving the propellers of a ship, it will of course be understood that my invention is in no sense limited to this specific application of the motor, and I have merely selected this particular field of application because it brings out very clearly the many possible arrangements of connecting and operating a motor embodying my present invention.

In Fig. 1 of the drawings, I have diagrammatically represented a two-speed induction motor embodying my present invention operatively included in a system of electric ship propulsion. The figure diagrammatically illustrates a quarter-phase alternating current generator of the rotating field type, which may be driven by any suitable prime-mover, such as an elastic fluid turbine. The rotating field structure of the generator carries a field winding 11 excited from any suitable source of direct current energy. Each phase of the armature winding of the generator consists of two independent parallel circuits, that is to say, phase I has two parallel circuits 12 and 13, while phase II has two parallel circuits 14 and 15, so that the generator has eight terminals. The generator is electrically connected to an induction motor embodying the improvements of my present invention. The primary winding of this motor is adapted to be connected for two different pole numbers, so that two different speed ratios between the prime-mover and the propellers can be obtained. As diagrammatically represented in this figure, the primary winding of the motor has eight circuits, or four circuits per phase. These eight circuits have a common terminal or neutral 16, or in other words, one terminal of each circuit is connected to the neutral 16. The other or free terminals of the eight circuits constitute the eight terminals of the motor, and an eight-blade double-throw switch 17 having a central "off" position serves to connect the motor to the generator for either pole number of the primary winding.

The rotor of the motor is diagrammatically represented as connected to the shaft of a propeller 18. The rotor carries the secondary winding, and for the purpose of obtaining the necessary motor torque for reversing or stopping after full speed ahead and generally for maneuvering the secondary winding may have an inductively changing effective resistance such as a double squirrel cage winding or a single squirrel cage winding in which the conductor bars are placed in relatively deep slots. However, for the purpose of explaining another feature and a further application of my present invention I have shown in Fig. 1 a wound rotor, and it will be observed that this rotor or secondary winding consists of eight independent circuits connected to a common neutral just as in the case of the primary winding. The eight free terminals of the secondary winding are adapted to be connected to the terminals of an eight-circuit resistance 19. Each of the eight circuits of this resistance has an adjustable terminal connected to a neutral 20, so that the resistance as a whole has eight free terminals. The free terminals of the secondary winding are brought out to slip rings 21, upon which bear coöperating brushes 22, whereby the eight free terminals of the secondary winding may be connected to the eight free terminals of the resistance 19. A short-circuiting switch 23 is illustrated for cutting out the resistance under normal navigating conditions. It will of course be understood that the resistance may be of any suitable construction, and that its showing and also the showing of the short-circuiting switch in Fig. 1 of the drawings are purely diagrammatic. It will be understood by those skilled in the art that the arrangement of the secondary winding is such that the winding is effective for both polar arrangements of the primary winding, and hence there is no necessity of changing the connections of the secondary winding when the primary winding is changed from one pole number to the other.

The method of connecting a winding in an eight-pointed star in accordance with the present invention thus makes it practical to use such a winding as the secondary winding in slip ring motors because the necessary number of slip rings is reduced to eight. However, it should be noted that while the number of slip rings used in accordance with present practice in two-speed induction motors having one independent winding for each number of poles is only six, three of these slip rings are always negative so that each of the six slip rings must be designed for a current more than twice as great as each of the eight slip rings in my improved motor. The same considerations apply to the size of the primary pole-changing switch in comparison with a motor of the present usual type having two independent primary windings. When the secondary winding is connected in an eight-pointed star with a slip ring for each terminal thereof and an eight-circuit resistance connected to the slip rings, the secondary circuit will respond automatically to each of the pole numbers of the primary winding without any change of connections of the secondary winding. In certain cases it is possible to further reduce the number of slip rings to four, as will be fully described hereinafter.

From the foregoing description it will be evident that my proposed winding, primary or secondary, for a quarter-phase induction motor consists of eight independent circuits, four circuits per phase, with one terminal of each circuit connected to a common neutral. It will be observed that the primary winding comprises in effect two parallel circuits per phase, and as hereinafter explained, the terminal voltage of the two parallel circuits per phase should be equal and should have approximately the same angular time phase. Each circuit contains those conductors or coils which carry current relatively in the same way when the winding as a whole is arranged for either pole number. The eight circuits of the primary winding are designated as follows, $Aa+$, $Aa-$, $Ab+$, $Ab-$, $Ba+$, $Ba-$, $Bb+$ and $Bb-$. Each circuit is thus designated by a capital letter, a small letter and a positive or negative sign. Reference letters A and B correspond to phases I and II, respectively, of one polar arrangement, while reference letters $a$ and $b$ correspond to phase I and II, respectively, of the other polar arrangement. Thus the circuits designated by letter A are connected in phase I and the circuits designated by letter B are connected in phase II for one polar arrangement, while the circuits designated by letter $a$ are connected in phase I and the circuits designated by letter $b$ are connected to phase II for the other polar arrangement. The circuits having a positive $(+)$ sign have the same relative terminal connections with respect to the direction of current flow in both polar arrangements, while the circuits having the negative sign $(-)$ have their terminal connections relatively reversed in the two polar arrangements.

It has hereinbefore been assumed that a two-speed quarter-phase winding must be divided into eight separate circuits or groups of conductors, and while this point is clearly explained in my aforementioned patents, I desire for the purposes of the following explanation to briefly review the reasons why eight circuits are necessary. Consider a particular conductor in phase I for one polar arrangement. There are four possible conditions for this conductor with the other polar arrangement. First, it may remain in the same phase with the same relative direction of current flow; second, it may remain in the same phase with a relatively reversed direction of current flow; third, it may be transferred to the second phase with the same relative direction of current flow; and fourth, it may be transferred to the second phase with a relatively reversed direction of current flow. These four conditions are obviously possible for every conductor of each phase, and if the conductors undergoing the same electrical change when passing from one polar arrangement to the other are arranged in the same circuit, it will be evident that there must be four circuits per phase, or eight circuits altogether. It will thus be evident that circuits $Aa+$ and $Bb+$ remain in the same phase with the same relative direction of current flow for both polar arrangements, while circuits $Aa-$ and $Bb-$ remain in the same phase with a relatively reversed direction of current flow. Also circuits $Ab+$ and $Ba+$ are transferred from one phase to the other when changing from one pole number to the other with the same relative direction of current flow in both phases, while circuits $Ab-$ and $Ba-$ are transferred from one phase to the other with a relatively reversed direction of current flow.

In order to demonstrate that it is possible to arrange the eight circuits of the primary winding with one terminal of each circuit connected to a common neutral, or as an eight-pointed star, and change the connections from one pole number to another, it is necessary to prove in each case that the resulting voltages in the two sets of parallel circuits in each phase are equal and have the same angular time phase. In the first place, it is necessary to lay out the winding and properly group the conductors into eight circuits. In order to more clearly explain my present invention and the application of the principles underlying the invention to the practical design of multi-speed induction motors, I have illustrated in Figs. 2, 3 and 4 of the accompanying drawings an actual layout of 5 and 7 poles of a 20 and 28 poles quarter-phase motor. The complete diagram for 20 and 28 poles is obviously obtained by repeating four times the layout for 5 and 7 poles. It will of course be understood that the layout illustrated for 5 and 7 poles applies to any quarter-phase induction motor having (5—7) K poles, where K is a whole even number, and, furthermore, that the principle by which this layout is made is generally applicable to any numbers of poles.

The method of working out a winding in accordance with my present invention consists of three stages; first, working out of the circuit connections inside the motor; second, the determination of the phase relations of the different circuits in order to find in which way these circuits can be combined in parallel without causing cross currents, and third, the arrangement of the circuits in the simplest control diagram observing the necessary relations of parallel circuits. These three stages will now be explained in connection with an actual winding, and those skilled in the art will readily understand therefrom the application of the principles of my present invention to the design of any polyphase motor having any desired speed ratio.

The machine under consideration in Figs. 2, 3 and 4 has 448 slots, but it is necessary to study only 112 slots in the layout of 5 and 7 poles. For the (5—7) poles layout there will thus be 56 slots per phase. The first two horizontal rows of arrows, designated A and B, represent the conductors of 5 poles of the two phases I and II, respectively, when the primary winding is connected for 20 poles. The groups of arrows in row B are displaced by 90 electrical degrees from the groups in row A, to represent the space displacement of the poles of the two phases of the primary winding. The third and fourth rows of arrows, designated $a$ and $b$, represent the conductors of seven poles of the two phases I and II, respectively, when the primary winding is connected for 28 poles, the groups of arrows in row $b$ being displaced by 90 electrical degrees from the groups in row $a$. Since 56 is not evenly divisible by five, one pole of the five pole arrangement must have twelve conductors, while the other four poles have eleven conductors each. In the seven pole arrangement there will be eight conductors per pole. Each arrow may be considered as representing the conductor or conductors located in one slot, and together the arrows indicate the space relations of the conductors connected in phases I and II and the relative directions of current flow through the conductors. As hereinafter explained, it is for some purposes more advantageous to consider the arrows as representing coil centers, in which case the directions of the arrows indicate the relative directions of current flow in the coils whose centers the arrows represent.

An examination of the four rows of arrows shows that certain arrows appear under the same conditions, that is, in the same phase and with the same relative directions of current flow, in both polar arrangements. Thus the fifth row of arrows designated $Aa+$ represents the conductor or coils which are connected in phase I with the same relative direction of current flow for both pole numbers, while the tenth row of arrows designated $Bb+$ represents the conductors which are connected in phase II with the same relative directions of current flow for both pole numbers. Similarly, the rows of arrows $Ab+$, $Aa-$, $Ab-$, $Ba+$, $Ba-$ and $Bb-$ represent the circuits in which the conductors thereof undergo the same electrical change in passing from one pole number to the other. It will be observed that in rows A*a*+, B*b*+, A*b*+ and B*a*+ the relative directions of current flow are the same for both pole numbers, and thus the arrows in these rows point in the same directions as the corresponding arrows in rows A, B, *a* and *b*. In the rows A*a*—, A*b*—, B*a*— and B*b*— the relative directions of current flow change when passing from one pole number to another, and it will be observed that the notation chosen is such that when corresponding arrows in rows A, B, *a* and *b* point toward each other the corresponding arrows in rows A*a*—, A*b*—, B*a*— and B*b*— point downwardly, while the arrows in the latter four rows point upwardly when the corresponding arrows in the former four rows point away from each other. In other words, the directions of current flow represented by the arrows in the eight rows A*a*+, A*b*+, etc., represent the coils or conductors forming the eight independent circuits of 5 poles of the 20-pole arrangement of the primary winding of the motor heretofore described.

Fig. 3 is obtained by combining the eight rows of arrows A*a*+, A*b*+, etc. The single row of arrows of Fig. 3 is in substance a superposition of the two rows of arrows A and B, and thus represents the directions of current flow in all the conductors in both phase windings for the five pole arrangement. The end connections between the conductors for arranging them in their proper circuits according to the eight rows of arrows A*a*+, A*b*+, etc., are diagrammatically shown in Fig. 3. The free end or terminal of each circuit is designated by the circuit reference characteristic A*a*+, A*b*+, etc. The other end or terminal of each circuit is connected to the neutral 16.

The end connections diagrammatically shown in Fig. 3 will be better understood by reference to Fig. 4, which is intended to explain the practical meaning of the arrows and the diagram of the end connections of Fig. 3 as applied to an actual winding. Each coil of the primary winding of the motor has two end terminals 30 and 31. The arrows of Fig. 3 indicate how the end terminals of the coils should be connected. The winding diagrammatically represented in Fig. 4 is the usual two-layer lap winding composed of uniform overlapping coils. Each slot thus contains the conductors of two coils, and in Fig. 4 the conductors in the bottoms of the slots are represented by dotted lines while the conductors in the tops of the slots are represented by full lines. Since each coil has two conductors or two sets of conductors separated by the coil pitch, it will make the present explanation more clear to consider the arrows of Fig. 3 as representing the centers of the coils shown in Fig. 4. Fig. 4 shows the coils of which the circuit B*a*+ is composed. The corresponding portion of Fig. 3 is shown in heavy lines. The free terminal of the circuit B*a*+ is connected to the end terminal 30 of coil 32 whose coil center is represented by arrow 52. The horizontal lines between arrows 52-57, inclusive, indicate that the coils whose centers these arrows represent are to be connected in series, and hence the end terminals of coils 32, 33, 34, 35, 36 and 37 are connected so as to include these coils in a series circuit, as illustrated in Fig. 4. Fig. 3 shows arrow 57 connected to arrow 58, and so the end terminal 31 of coil 37 is connected to the end terminal 31 of coil 38 in Fig. 4. The direction of arrow 57 is opposite to that of arrow 58, thus indicating that the relative directions of current flow in coils 37 and 38 are opposite. For this reason, terminal 31 of coil 37 is connected to the corresponding terminal 31 of coil 38, whereby the relative directions of current flow in coils 37 and 38 are opposite. Coils 38, 39, 40, 41, 42, 43 and 44 are connected in series, as directed by the interconnection of the arrows 58-64, inclusive, of Fig. 3, and then terminal 30 of coil 44 is connected to terminal 30 of coil 45, while the terminal 31 of the latter coil is connected to the neutral 16, as indicated by the connection of arrow 65 of Fig. 3. The other seven circuits of the primary winding of the motor are formed by connecting the end terminals of the other coils in accordance with the diagram of Fig. 3, just as explained in Fig. 4 in connection with circuit B*a*+.

The full line portion of Fig. 3 is the layout of 5 and 7 poles. As hereinbefore mentioned, this layout is repeated four times in a 20 and 28 poles motor, and the dotted line portion of Fig. 3 shows the beginning of such an extension of the layout. For every five and seven poles of the layout for the complete motor winding there will be in effect one complete circuit corresponding to the circuits A*a*+, A*b*+, etc., and corresponding circuits may be connected in parallel, by connecting their ends to a common terminal, as indicated by the multiple connections 70 in Fig. 3.

The double-throw switch 17 of Fig. 1 has a central "off" position. This switch is designed to change the connections of the eight motor circuits A*a*+, A*b*+, etc., for changing the pole numbers of the primary winding. In Figs. 5 and 6, I have diagrammatically illustrated a six-pole double-throw switch 71 for changing the pole numbers. Fig. 5 shows the switch thrown to connect the motor circuits for 20 poles, while Fig. 6 shows the switch thrown to connect the motor circuits for 28 poles. The quarter-phase source of energy is represented by the eight leads designated $I_1+$, $I_1-$, $I_2+$, $I_2-$, $II_1+$, $II_1-$, $II_2+$ and $II_2-$, which notation is to signify that each phase of the source of supply has two circuits, thus phase I has two circuits, of which $I_1+$ and $I_1-$ are the terminals of one circuit and $I_2+$ and $I_2-$ are the terminals of the other circuit. A comparison of the connections of the eight circuits $Aa+$, $Ab+$, etc., for the two polar arrangements will show that the change indicated by the legend of each circuit is properly effected by the switch 71. That is to say, circuits $Aa+$ and $Bb+$ are (permanently) connected to the same terminals of the source of supply for both polar arrangements, circuits $Ab-$ and $Ba-$ are connected in the other phase with relatively reversed directions of current flow in passing from one pole number to the other, etc.

In order to demonstrate that it is possible to arrange the eight circuits of the primary winding in a star as described and change the connections from one pole number to the other it is necessary to prove that in each case the resulting voltages in the parallel circuits of each phase are approximately equal in magnitude and have approximately the same angular time phase. For this purpose the phase of each circuit of the winding is analyzed to determine what the relative phase relations of the different circuits are. The result of this analysis usually indicates immediately in which way the circuits must be connected in order to make possible such an arrangement of the circuits as hereinbefore described, and usually it is found that only the one arrangement is possible. Fig. 7 illustrates the method of making such an analysis of the phase relations of the eight circuits. This figure is derived from Fig. 2 as follows: Above the first row of arrows A of Fig. 2 is a row of numerals which indicate in electrical degrees the angular displacement of the conductors, or coil centers, represented by the arrows for the 20 pole arrangement. In order to simplify the drawings, the numerical angular displacement of only alternate conductors is indicated in Fig. 2. These numerals thus indicate the relative phase displacements of the currents flowing in the conductors or coils represented by these arrows. The oblique line 0°—0° of Fig. 7 is taken as the zero line, and each conductor or coil of circuit $Aa+$ is vectorially plotted with its proper angular displacement from the zero line. In Fig. 7 each vector is designated by its angular numerical displacement from the zero line, as given by the numerals above the arrows in the row designated $Aa+$. The resultant of the fourteen vectors represents vectorially the magnitude and phase of the resultant voltage of the circuit $Aa+$. In a similar manner the vectors of the other seven circuits are plotted to obtain the phase magnitude of their respective resultant voltages, and the vectors of these resultant voltages are shown in Fig. 7, and are designated by the reference characteristics of their respective circuits. The row of numerals below the row of arrows $b$ represents the phase displacements of the corresponding conductors when the winding is arranged for 28 poles, and since corresponding conductors of each pole are similarly displaced for this polar arrangement, the numerical displacement for only one pole is given. From this latter row of numerals the vector diagram of the eight circuits for the 28 pole arrangement shown in Fig. 8 is obtained. Similarly, Figs. 9 and 10 show the vector diagrams for the eight circuits of a motor whose primary winding is adapted to be connected for 24 and 36 poles, respectively, and Figs. 11 and 12 show the vector diagrams of a motor whose primary winding is adapted to be connected for 22 and 34 poles, respectively.

In Figs. 7, 8, 9, 10, 11 and 12 the numerical annular displacement in electrical degrees of the resultant voltage of the various motor circuits as well as the lengths (L) of the vectors are indicated alongside the corresponding vectors. The length of any vector obviously represents the magnitude of the resultant voltage of the corresponding motor circuit, but arbitrary values of length, for example centimeters, are more satisfactory than voltage values for the present considerations. The vector diagrams of these figures thus show the phase relation and relative magnitudes of corresponding pairs of circuits for both pole numbers of the primary winding. From these diagrams the possibilities and limitations for any ratio of pole numbers of the primary winding may be determined. For example, it will be noted from Figs. 9 and 10 that the voltages of the pairs of parallel circuits are exactly in phase for both the 24- and 36-pole connections of the 24—36 pole winding. However, the 24-pole connection (Fig. 9) gives a resultant regular quarter-phase star, whereas the 36-pole connection (Fig. 10) gives resultant voltages in correct quarter-phase relation, but the voltages of the separate parallel circuits are not arranged in a regular star, so that the point of intersection of the resultant quarter-phase voltage vectors is offset to one side. In other words, the resultant voltage of circuits $Aa+(Aa-)$ and $Ba-(Ba+)$ is 90 electrical degrees displaced in time phase from the resultant voltage of circuits $Bb+(Bb-)$ and $Ab+(Ab-)$, but the intersection of these resultant voltages is offset to one side as shown by the dotted lines $Ir$ and $IIr$, vectorially representing these resultant voltages in Fig. 10. From Figs. 7 and 8, it will be seen that for both pole connections of the 20—28 pole winding the resultant voltages of corresponding circuits are almost but not exactly in phase, yet so nearly in phase that for practical purposes they may be considered in phase. On the other hand the resultant voltages of corresponding circuits for the 34-pole connection of the 22—34 pole winding are practically in phase, as shown in Fig. 12, but from Fig. 11 it will be seen that for the 22-pole connection the resultant voltages of corresponding circuits are so much out of phase that it would not be permissible to connect corresponding circuits of each phase in parallel. The diagram of Fig. 11 shows that the angular displacement between the voltages of circuits A$a$+ and A$a$— is the same (4.09 electrical degrees) as between the circuits A$b$— and A$b$+, so that circuits A$a$+ and A$b$— give a resultant voltage which is in phase with and equal to the resultant voltage of circuits A$a$— and A$b$+. The two circuits (A$a$+ and A$b$—) and (A$a$— and A$b$+) may therefore be fed by current derived from the same alternator or transformer, but since there is a difference of potential between the two circuits themselves, the energy for these circuits must be derived from independent circuits in the source of supply, and there must be no metallic connection between these independent circuits. The same relation is true of the circuits B$a$+, B$a$—, B$b$+ and B$b$—, since the angular displacement between the voltages of circuits B$a$+ and B$a$— (B$b$+ and B$b$—) is 10.23 electrical degrees.

When the vector diagrams of the phase relations and magnitudes of the resultant voltages of the eight motor circuits for both pole numbers have been obtained as hereinbefore described, the various practical and advantageous connections of the motor to a source of supply can be determined. In certain instances, that is for certain pole numbers, it is necessary that the source of energy supply have two independent circuits per phase, in order to prevent cross currents resulting from too great a difference in voltage of the corresponding motor circuits. Such an instance has been illustrated in the case of the 22-pole connection of the 22—34 pole winding. As a general proposition it may be said that the source of energy supply should have two independent circuits per phase in order to prevent cross currents and where such a source of energy is available the motor may have any desired ratio of pole numbers. There are many instances, however, where two circuits per phase are not necessary, and the pole numbers specifically illustrated in connection with Figs. 7–12 inclusive have been chosen to illustrate some of the many desirable connections with which my improved motor winding can be operated.

A quarter-phase source of electric energy supply having two independent circuits per phase is adapted to be used in combination with a quarter-phase induction motor embodying my present invention having any practical ratio of primary magnetic poles. Such a source of energy supply is preferably a two-circuit per phase generator such as diagrammatically illustrated in Fig. 1. Where it is not convenient to use a source of quarter-phase power having two independent circuits per phase for those instances where such an arrangement or an equivalent is needed, as in the 22-pole connection of the 22—34 pole motor, a set of auto-transformers may be employed with the middle point of each auto-transformer connected to a terminal of the source and the free terminals of each auto-transformer arranged for connection to a pair of terminals of the primary winding of the motor. The controlling device for effecting the change of the motor circuits for establishing one pole number or the other must then be introduced between the auto-transformers and the motor. Such an arrangement is diagrammatically illustrated in Fig. 16 of the drawings. The principal source of supply such as an alternating current generator is represented in this figure by the quadrature windings 75 and 76. Auto-transformers 77, 78, 79 and 80 have their middle points connected to the terminals of the windings 75 and 76 as illustrated. The eight terminals of the auto-transformers are then equivalent to the eight terminals of the two-circuit per phase generator, and are accordingly designated in Fig. 16 with the same reference characteristics $I_1$+, $I_2$+, etc. A pole-changing switch 81 having a central "off" position is adapted to make the proper connections of the motor circuits A$a$+, A$b$—, etc., to the terminals $I_1$+, $I_2$+, etc., for one pole number or the other.

For certain pole numbers a generator having two circuits per phase, such as shown in Fig. 1, may have its circuits connected in a continuous circuit, with each generator circuit forming vectorially one side of a square. Such a connection is diagrammatically illustrated in Fig. 14, where the four generator circuits 87, 88, 89 and 90 are connected in a continuous circuit which will hereinafter be referred to as a square connection, as distinguished from the parallel connection diagrammatically represented in Fig. 1. The pairs of diagonally opposite corners of this square diagrammatically constitute the terminals of the two phases of the generator, and, in order to preserve the notation herein employed, I have designated the terminals of one phase as ($I_1$+ $I_2$+) and ($I_1$— $I_2$—), while the terminals of the other phase are designated (II$_1$+ II$_2$+) and (II$_1$— II$_2$—). A pole changing switch 91 makes the necessary changes in the connections of the motor circuits for changing the primary magnetic pole numbers of the motor. Since the terminal voltage of each phase of the generator with the square connection is the resultant of the voltages of two circuits displaced by 90 electrical degrees it will be evident that this terminal voltage is $\sqrt{2}$ times the voltage of each motor circuit, and therefore $\sqrt{2}$ times the terminal voltage of the generator with its windings connected in parallel relation as in Fig. 1.

In my copending application for Letters Patent of the United States filed Sept. 3, 1915, Serial No. 48,819, I have described a system of electric ship propulsion in which the circuits of the generator are changed from a square to a parallel connection in order to vary the characteristics of the generator for different conditions of navigation. A motor embodying my present invention is particularly adapted for operation in such a system. In certain cases it is desirable that the generator should have different operating characteristics for different pole numbers. For example, in electric ship propulsion, it may be advisable in certain instances to employ a square connection of the generator circuits with the high speed pole number of the motor for high speed navigation, and to employ a parallel connection of the generator circuits with the low speed pole number of the motor for reversing and maneuvering operations. The terminal voltage of the generator with the square connection is 2 times the terminal voltage of the same generator with the parallel connection. The stopping or reversing after full speed ahead of a ship's propellers requires a relatively large torque of the propeller-driving motors, and since a large torque means a relatively large motor current, a decrease in the voltage of the energy supply will enable a larger current to be taken by the propeller-driving motors, provided of course the total amount of available energy remains constant.

In Fig. 17 I have illustrated a generator having two independent circuits per phase. Thus phase I has two circuits 82 and 83 and phase II has two circuits 84 and 85. A controlling switch 86 is operatively connected between the terminals of the generator and the eight terminals of the motor and is adapted to connect the generator circuits in parallel for one pole number of the motor and in a continuous circuit with each generator circuit forming vectorially one side of a square for the other pole number of the motor, and simultaneously to effect the necessary pole-changing connections of the eight motor circuits. Thus when the switch 86 is thrown to its right-hand position the generator circuits 82, 83, 84 and 85 are parallel-connected per phase and the motor circuits are connected to conform with reference letters A and B, and when the switch is thrown to its left-hand position, the generator circuits are square-connected and the motor circuits are connected to conform with reference letters $a$ and $b$. The voltage impressed on the motor for one pole number is therefore $\sqrt{2}$ times that impressed for the other pole number, and, accordingly, when the electric energy delivered to the propeller-driving motors is of the relatively lower voltage a relatively larger current may be taken by the motors for the same energy input. In electric ship propulsion where the low speed pole number is used for reversing, the motor current and accordingly the reversing torque may thus be increased by connecting the generator circuits in parallel for the higher number of poles, where these same circuits are connected in a square for the lower number of poles.

Figure 13:
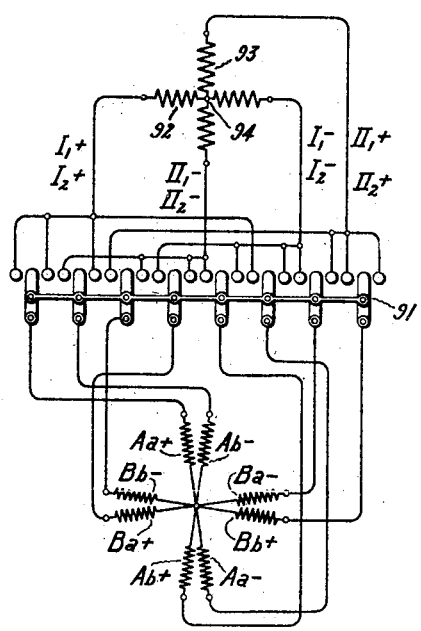
Figure 14:
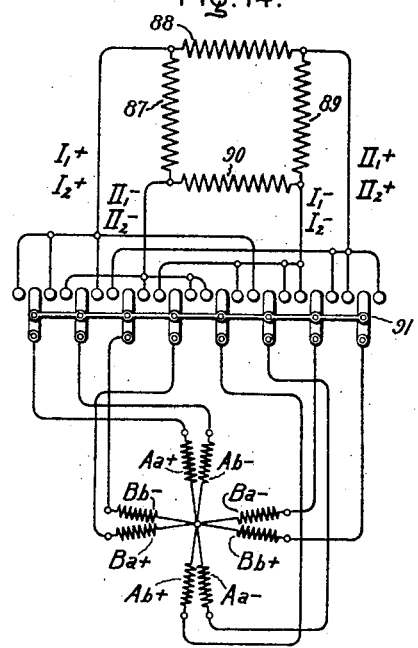
Figure 15:
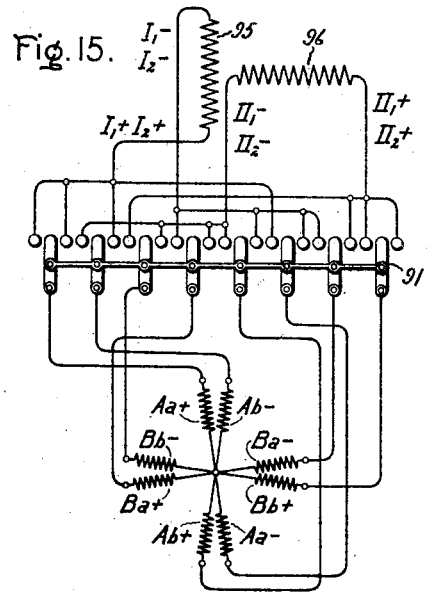
Figure 16:
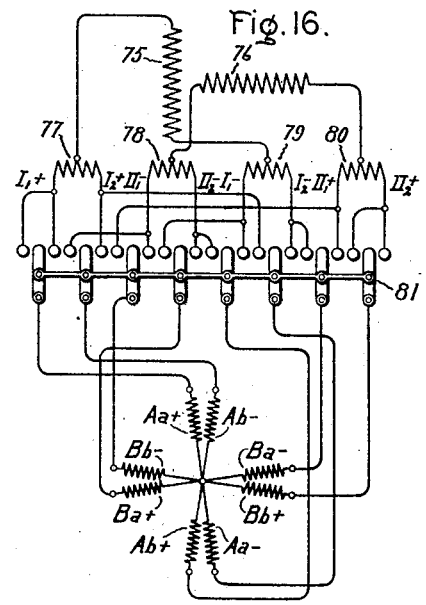

In Figs. 13 and 15 of the drawings I have diagrammatically illustrated my improved motor connected to a generator having one circuit per phase. In the generator connection represented in Fig. 13 the two quarter-phase generator circuits 92 and 93 are connected as a quarter-phase star with a neutral 94. In Fig. 15 the quarter-phase generator circuits 95 and 96 are electrically independent so that the generator has one independent circuit in each phase. The generator terminals are designated by the same reference characteristics ($I_1+$ $I_2+$), ($II_1-$ $II_2-$), etc., as in Fig. 14, and the pole-changing switch 91 shown in Figs. 13 and 15 is the same as that shown in Fig. 14.

In Figs. 13, 14 and 15 of the drawings I have shown only a pole-changing switch between the source of electric energy supply and the multi-speed motor, so that the operating characteristic of the source is the same for both pole numbers of the primary winding of the motor. It will be understood from the foregoing explanations that for certain pole numbers the sources of energy supply illustrated in Figs. 13, 14, and 15 would not be permissible. It will, accordingly, be understood that the source of energy supply shown in these figures must be used with those pole numbers in which the voltage of corresponding primary winding circuits are practically in phase so as to prevent cross currents. The sources of energy supply represented in these figures may be used for one pole number and a source of energy having independent circuits per phase may be used for the other pole number and a pole-changing switch may be employed which will alter the connections of the source, just as in the arrangements illustrated in Fig. 17.

Referring again to the vector diagrams of Figs. 7-12 inclusive it will be observed that with each of the three motors there represented the connections for one pole number are such that corresponding circuits of each phase are connected relatively in the same phase for both pole numbers. In other words the eight circuits may be divided into four groups in each of which the conductors or coils of the two circuits thereof carry current of relatively the same phase for both pole numbers. For example, an inspection of Figs. 8, 10, and 11 will show that for the pole numbers represented by these figures the corresponding circuits are ($Aa+$ and $Aa-$), ($Bb+$ and $Bb-$), ($Ba-$ and $Ba+$) and ($Ab+$ and $Ab-$). That is to say the two corresponding circuits of each pair are connected relatively in the same phase with a reversal of the relative direction of current flow, for both pole numbers. Thus the two circuits $Aa+$ and $Aa-$ are connected in phase I for both pole numbers, the two circuits $Bb+$ and $Bb-$ are connected in phase II for both pole numbers, the two circuits $Ba-$ and $Ba+$ are connected in phase II for one pole number and in phase I for the other pole number, while the two circuits $Ab+$ and $Ab-$ are connected in phase I for one pole number and in phase II for the other pole number. This characteristic of my improved winding is of particular advantage in connection with the secondary winding of the motor. Thus if the secondary winding of the motor is wound like the primary winding in accordance with my present invention, as hereinbefore explained, and if the free terminals of corresponding circuits of this secondary winding are permanently connected together when the similar circuits of the primary winding are arranged so that the coils or conductors of corresponding circuits carry current of relatively the same phase for both pole connections, a secondary winding will be produced which is open-circuited when the primary winding is connected for the one or basal pole number and short-circuited on itself when the primary winding is connected for the other pole number. The free terminals of the corresponding circuits thus connected together may be brought out to suitable slip rings, whereby the motor has only four slip rings, instead of eight as in Fig. 1. Such a connection of the circuits of the secondary winding is diagrammatically represented in Fig. 18 of the drawings. In this figure, I have illustrated a source of quarter-phase electric energy of the character described in conjunction with Fig. 17 for delivering energy to the primary winding of the motor. The secondary winding has eight circuits $A'a'+$; $A'a'-$; $B'a'-$; etc., corresponding to the similarly designated circuits of the primary winding. The eight circuits of the secondary winding are arranged like the eight circuits of the primary windings of the motors vectorially represented in Figs. 8, 10 and 11. The free terminals of the corresponding circuits ($A'a'+$ and $A'a'-$), etc., are connected together and to slip rings 97, 98, 99, 100, respectively. Brushes 101 bear on the slip rings and are electrically connected to the terminals of a four-circuit resistance 102, connected as a quarter-phase star with a neutral. It will be evident to those skilled in the art that when the secondary winding of my improved motor is connected as indicated in Fig. 18 the corresponding circuits ($A'a'+$ and $A'a'-$; etc., of each pair are connected in parallel relation when the eight circuits of the primary winding are connected as represented in Figs. 8, 10 and 11. The secondary winding is under this condition open-circuited and must be completed through the external resistance 102, so that for this pole number of the primary winding the resistance 102 is actively included in the secondary winding circuit. In changing the pole numbers of the primary winding the circuit $Aa-$ remains connected in the same phase (I) but with a reversed direction of current flow, and, accordingly when this change of connections of the primary winding is made the direction of current flow in the secondary circuit $A'a'-$ will reverse, and the two circuits $A'a'+$ and $A'a'-$ will be connected in series, thereby forming in effect a short-circuited secondary winding. It will be evident from the legends of the eight circuits of the secondary winding that this same condition exists in each pair of corresponding circuits, and the entire secondary winding is thus short-circuited on itself.

The connections of the circuits of the secondary winding which I have just described are of particular advantage in motors designed for driving a ship's propellers. In ship propulsion a very large torque is required for stopping or reversing after full speed ahead, and to a lesser degree for maneuvering in harbors and about wharves. In order to provide a satisfactory reversing torque in a system of ship propulsion employing propeller-driving induction motors William L. R. Emmet has heretofore proposed in an application filed July 8, 1915, Serial No. 38,807, the use of a multi-speed induction motor in which the low speed pole number of the primary winding is used for reversing and maneuvering. An induction motor embodying my present invention, and in particular the connections of the secondary winding illustrated in Fig. 18, is especially adapted to be employed in the system of ship propulsion described in the Emmet application. Thus the secondary winding will be connected so that it is in effect short-circuited on itself for the lower number of poles, that is for the high speed pole numbers of the primary winding, and so that the external resistance is actively included in the secondary circuit with the higher number of poles, that is for the low speed pole number of the primary winding. Thus the external resistance is automatically included in the secondary circuit of the motor whenever the primary winding is connected for the low speed pole number, but on the other hand the secondary winding is short-circuited on itself and acts like an ordinary squirrel cage winding when the primary winding is connected for the high speed pole number.

When the circuits of the secondary winding are arranged as represented in Fig. 18 with the free terminals of corresponding circuits permanently connected together, it is not necessary that all of the circuits should be connected to one single neutral. Instead, the secondary winding may have two neutrals to each of which one terminal of four secondary winding circuits are connected. Fig. 19 illustrates this modification of the connection of Fig. 18. The four circuits $A'a'+$, $A'a'-$, $A'b'+$, and $A'b'-$ have one terminal of each connected to a neutral 16', while the other four circuits $B'b'-$, $B'b'+$, $B'a'-$, and $B'a'+$, have one terminal of each connected to a neutral 16''. For one pole connection of the primary winding, corresponding to that represented in Figs. 8, 10, and 11, the secondary winding is thus a polyphase winding of which slip rings 97 and 99 constitute the terminals of phase I and slip rings 98 and 100 constitute the terminals of phase II. These slip rings may be connected to a resistance just as in Fig. 18, or may be connected to terminals $I_1+$ $I_2+$, $I_1- I_2-$, $II_1+ II_2+$, and $II_1- II_2-$ adapted to supply quarter-phase electric energy to a second induction motor having a primary winding of the type herein described, so that by changing the pole numbers of the primary winding of this second induction motor two concatenated speeds may be obtained. For the other pole number of the primary winding of the main motor the secondary winding represented in Fig. 19 is short-circuited on itself just as the winding of Fig. 18. The secondary winding circuits are therefore permanently interconnected so that polyphase electric energy having independent circuits per phase can be taken from the terminals of the secondary winding for one pole number of the primary magnetic field and so as to form a locally short-circuited secondary winding for the other pole number of the primary magnetic field.

The vector diagrams for the two polar arrangements of the primary winding of a motor embodying my present invention indicate at once the possible arrangements of the motor windings to the source of energy supply. For example, the vector diagrams of Figs. 9 and 10 show that the 24—36 pole motor may with the 24-pole arrangement of its primary winding be connected with a generator having its windings connected as a quarter-phase star with a neutral (Fig. 13), as a quarter-phase square (Fig. 14), as a quarter-phase winding with one independent circuit in each phase (Fig. 15), and as a quarter-phase winding with two independent circuits in each phase (Fig. 1). The 34-pole connection of the 22—34 pole motor (Figs. 11 and 12) has the same possibilities as the 24-pole connection, although the phase relations with the 34-pole connection are only approximate, so that a circulating current might be expected which would, however, in most cases be negligible for practical purposes. On the other hand the 22-pole connection (Fig. 11) must be connected to a source having an independent quarter-phase winding with two independent circuits per phase. The fact that the 24-pole connection offers a variety of possibilities for connection to the source may be taken advantage of for special applications of the motor. For example, in electric ship propulsion by using a quarter-phase square connection with the 24-pole connection and a parallel connection with the 36-pole connection the voltage of the generator can be changed in the ratio of $\sqrt{2:1}$ as heretofore explained. If the same idea of changing the voltage when the number of primary poles is changed is to be carried out in the 22—34 pole motor and it is desired to use the higher voltage with the 22-pole connection, it will be necessary to connect the generator in a square connection with two circuits in multiple on each side of the square, so as to provide two independent square-connected generator windings, whereby the flow of cross-currents is avoided.

I have throughout the specification explained the various features of my invention in connection with quarter-phase motors and systems, but, as hereinbefore stated, I desire it to be understood that the invention is applicable generally to any polyphase motor or system, and I have chosen quarter-phase arrangements to illustrate the invention principally because the control connections are simpler and more conducive to a ready and comprehensive understanding of the principles of the invention. On account of the greater simplicity of the control connections the quarter-phase arrangements are in practice generally preferable, and, accordingly, I believe that the quarter-phase arrangements represent the preferred forms of the invention.

Those skilled in the art will understand that the secondary winding of my present invention may be used with advantage with any type of pole-changing primary winding. Thus a single primary winding or independent primary windings for each pole number may be used to produce primary magnetic fields of two different pole numbers, so that the improved secondary winding of my present invention is adapted for use generally with any means for producing primary magnetic fields of two different pole numbers, but I prefer to use the improved primary winding of my present invention for producing such primary magnetic fields.

I have herein shown and particularly described certain embodiments of my invention for the purpose of explaining its principles and illustrating its applications, but numerous modifications of the details of construction and arrangement of these embodiments and other applications will readily present themselves to those skilled in the art. I, therefore, wish to cover by the following claims all modifications within the spirit of the invention.

What I claim as new and desire to secure by Letters Patent of the United States is:—

1. An induction motor having a polyphase primary winding adapted to be connected to produce polyphase primary magnetic fields of two different pole numbers, said polyphase primary winding comprising a plurality of circuits each of which contains conductors which carry current relatively in the same way when the primary winding is connected for either number of poles, said primary winding having a single neutral to which one terminal of each circuit is permanently connected.

2. An induction motor having a quarter-phase primary winding adapted to be connected to produce primary magnetic fields of two different pole numbers, said primary winding comprising eight circuits each of which contains conductors which carry current relatively in the same way when the primary winding is connected for either number of poles, said primary winding having a neutral to which one terminal of each circuit is permanently connected whereby the winding has only eight free terminals.

3. An induction motor having means for producing polyphase primary magnetic fields of two different pole numbers, and a polyphase secondary winding comprising a plurality of circuits each of which contains coils which carry current relatively in the same way for either number of primary magnetic poles, each of said circuits having one of its terminals permanently connected to one terminal of another circuit so that the conductors of these two circuits carry currents of the same phase for one pole number of the primary magnetic field and of different phases for the other pole number of the primary magnetic field.

4. An induction motor having a polyphase primary winding adapted to be connected to produce polyphase primary magnetic fields of two different pole numbers, said polyphase primary winding comprising a plurality of circuits each of which contains coils which carry current relatively in the same way when the primary winding is connected for either number of poles, said primary winding having a neutral to which one terminal of each circuit thereof is permanently connected, and a secondary winding comprising a plurality of circuits similar to the circuits of said primary winding, each circuit of said secondary winding having one of its terminals permanently connected to one terminal of another circuit so that the conductors of these two circuits carry currents of the same phase for one pole number of the primary winding and of different phases for the other pole number of the primary winding.

5. An induction motor having a polyphase primary winding adapted to be connected to produce polyphase primary magnetic fields of two different pole numbers and a polyphase secondary winding, each of said windings comprising a plurality of similar circuits each of which contains conductors which carry current relatively in the same way when the primary winding is connected for either number of poles, said primary winding having a neutral to which one terminal of each circuit thereof is permanently connected, each circuit of said secondary winding having one of its terminals permanently connected to one terminal of another circuit so that the conductors of these two circuits carry currents of the same phase for one pole number of the primary winding and of different phases for the other pole number of the primary winding.

6. An induction motor having means for producing polyphase primary magnetic fields of two different pole numbers, and a polyphase secondary winding comprising a plurality of circuits each of which contains conductors which carry current relatively in the same way for either pole number of the primary magnetic field, each circuit of said secondary winding having one of its terminals permanently connected to one terminal of another circuit so that the conductors of these two circuits carry currents of the same phase for one pole number of the primary magnetic field and of different phases for the other pole number of the primary magnetic field, the free terminals of said circuits being connected to form a plurality of groups in each of which the circuits thereof are arranged in parallel relation for one pole number of the primary magnetic field and in series relation for the other pole number of the primary magnetic field.

7. An induction motor having means for producing polyphase primary magnetic fields of two different pole numbers, and a polyphase secondary winding comprising a plurality of circuits each of which contains conductors which carry current relatively in the same way for either pole number of the primary magnetic field, each circuit of said secondary winding having one of its terminals permanently connected to one terminal of another circuit so that the conductors of these two circuits carry currents of the same phase for one pole number of the primary magnetic field and of different phases for the other pole number of the primary magnetic field, those circuits which carry current of the same relative phase for both pole numbers of the primary magnetic field having their free terminals permanently connected together.

8. An induction motor having means for producing polyphase primary magnetic fields of two different pole numbers, and a polyphase secondary winding comprising a plurality of circuits each of which contains conductors which carry current relatively in the same way for either pole number of the primary magnetic field, each circuit of said secondary winding having one of its terminals permanently connected to one terminal of another circuit so that the conductors of these two circuits carry currents of the same phase for one pole number of the primary magnetic field and of different phases for the other pole number of the primary magnetic field, the free terminals of said circuits being so connected that the secondary winding is in effect open-circuited for one pole number of the primary magnetic field and in effect short-circuited on itself for the other pole number of the primary magnetic field.

9. An induction motor having a primary winding adapted to be connected to produce primary magnetic fields of two different pole numbers and a secondary winding, each of said windings comprising a plurality of similar circuits each of which contains conductors which carry current relatively in the same way when the primary winding is connected for either number of poles, said primary winding having a neutral to which one terminal of each circuit thereof is permanently connected, each circuit of said secondary winding having one of its terminals permanently connected to a neutral to which certain of the other secondary winding circuits also have one terminal thereof permanently connected, the free terminals of said secondary winding circuits being connected to form a plurality of groups in each of which the circuits thereof are arranged in parallel relation for one pole number of the primary winding and in series relation for the other pole number of the primary winding.

10. An induction motor having a primary winding adapted to be connected to produce primary magnetic fields of two different pole numbers and a secondary winding, each of said windings comprising a plurality of similar circuits each of which contains conductors undergoing the same electrical change when the primary winding is changed from one pole number to the other, said primary winding having a neutral to which one terminal of each circuit thereof is permanently connected, each circuit of said secondary winding having one of its terminals permanently connected to a neutral to which certain of the other secondary winding circuits also have one terminal thereof permanently connected, the free terminals of said secondary winding circuits being so connected that the secondary winding is in effect open-circuited for one pole number of the primary winding and in effect short-circuited on itself for the other pole number of the primary winding.

11. An induction motor having a quarter-phase primary winding adapted to be connected to produce primary magnetic fields of two different pole numbers and a secondary winding, each of said windings comprising eight circuits each of which contains conductors which carry current relatively in the same way when the primary winding is connected for either number of poles, said primary winding having a neutral to which one terminal of each circuit thereof is permanently connected whereby the winding has eight free terminals, each circuit of said secondary winding having one of its terminals permanently connected to a neutral to which certain of the other secondary winding circuits also have one terminal thereof permanently connected.

12. An induction motor having means for producing quarter-phase primary magnetic fields of two different pole numbers, and a secondary winding comprising eight circuits each of which contains conductors which carry current relatively in the same way for either pole number of the primary magnetic field, each of said circuits having one of its terminals permanently connected to one terminal of another circuit so that the conductors of these two circuits carry currents of the same phase for one pole number of the primary magnetic field and of different phases for the other pole number of the primary magnetic field.

13. An induction motor having means for producing quarter-phase primary magnetic fields of two different pole numbers, and a secondary winding comprising eight circuits each of which contains conductors which carry current relatively in the same way for either pole number of the primary magnetic field, each of said circuits having one of its terminals permanently connected to a neutral to which certain of the other circuits also have one terminal thereof permanently connected whereby the secondary winding has eight free terminals, the free terminals of said circuits being connected to form four groups in each of which the two circuits thereof are arranged in parallel relation for one pole number of the primary magnetic field and in series relation for the other pole number of the primary magnetic field.

14. An induction motor having a quarter-phase primary winding adapted to be connected to produce primary magnetic fields of two different pole numbers and a secondary winding, each of said windings comprising eight circuits each of which contains conductors which carry current relatively in the same way when the primary winding is connected for either number of poles, said primary winding having a neutral to which one terminal of each circuit thereof is permanently connected whereby the winding has eight free terminals, each circuit of said secondary winding having one of its terminals permanently connected to a neutral to which certain of the other secondary winding circuits also have one terminal thereof permanently connected whereby the secondary winding has eight free terminals, the free terminals of said secondary winding circuits being connected to form four groups in each of which the two circuits thereof are arranged in parallel relation for one pole number of the primary winding and in series relation for the other pole number of the primary winding.

15. An induction motor having a polyphase primary winding adapted to be connected to produce primary magnetic fields of two different pole numbers, said primary winding comprising a plurality of circuits each of which contains conductors which undergo the same electrical change in passing from one pole number of the primary winding to the other, each of said circuits having one of its terminals connected to a neutral common to all of said circuits whereby the primary winding has only as many free terminals as it has different circuits.

16. An induction motor having means for producting polyphase primary magnetic fields of two different pole numbers, and a polyphase secondary winding comprising a plurality of circuits each of which contains conductors which undergo the same electrical change when the primary magnetic field is changed from one pole number to the other, each of said circuits having one of its terminals permanently connected to one terminal of another circuit so that the conductors of these two circuits carry currents of the same phase for one pole number of the primary magnetic field and of different phases for the other pole number of the primary magnetic field.

17. An induction motor having a primary winding adapted to be connected to produce primary magnetic fields of two different pole numbers said primary winding comprising a plurality of circuits each of which contains conductors which carry current relatively in the same way when the primary winding is connected for either number of poles, said primary winding having a neutral to which one terminal of each circuit thereof is permanently connected, and a secondary winding comprising a plurality of circuits each of which contains conductors which carry current relatively in the same way when the primary winding is connected for either number of poles, the circuits of said secondary winding being connected to form a plurality of groups in each of which the circuits thereof are arranged in parallel relation for one pole number of the primary winding and in series relation for the other pole number of the primary winding.

18. An induction motor having a quarter-phase primary winding adapted to be connected to produce primary magnetic fields of two different pole numbers, said primary winding comprising eight circuits each of which contains conductors which carry current relatively in the same way when the primary winding is connected for either number of poles, said primary winding having a neutral to which one terminal of each circuit thereof is permanently connected whereby the winding has eight free terminals, and a secondary winding comprising a plurality of circuits containing conductors which carry current relatively in the same way when the primary winding is connected for either number of poles, the circuits of said secondary winding being connected to form a plurality of groups in each of which the circuits thereof are arranged in parallel relation for one pole number of the primary winding and in series relation for the other pole number of the primary winding.

19. An induction motor having a primary winding adapted to be connected to produce primary magnetic fields of two different pole numbers and a secondary winding, each of said windings comprising a plurality of similar circuits each of which contains conductors which undergo the same electrical change when the primary winding is changed from one pole number to the other, said primary winding having a neutral to which one terminal of each circuit thereof is permanently connected, the circuits of said secondary winding being permanently interconnected so that polyphase electric energy can be taken from the terminals thereof for one pole number of the primary winding and so as to form a locally short-circuited winding for the other pole number of the primary winding.

20. The combination with an induction motor having a polyphase primary winding adapted to be connected to produce primary magnetic fields of two different pole numbers, said primary winding comprising a plurality of circuits each of which contains conductors which carry current relatively in the same way when the primary winding is connected for either number of poles, said primary winding having a neutral to which one terminal of each circuit thereof is permanently connected whereby the winding has only as many free terminals as it has different circuits, of a polyphase source of electric energy having an independent circuit for every pair of free terminals of the primary winding, and means for connecting the free terminals of the primary winding to said source of energy so as to produce either pole number of the primary winding.

21. The combination with an induction motor having a polyphase primary winding adapted to be connected to produce primary magnetic fields of two different pole numbers and a secondary winding, each of said windings comprising a plurality of circuits each of which contains conductors which carry current relatively in the same way when the primary winding is connected for either number of poles, said primary winding having a neutral to which one terminal of each circuit thereof is permanently connected, each circuit of said secondary winding having one of its terminals permanently connected to a neutral to which some or all of the other secondary winding circuits also have one terminal thereof permanently connected, the free terminals of said secondary winding circuits being connected to form a plurality of groups in each of which the circuits thereof are arranged in parallel relation for one pole number of the primary winding and in series relation for the other pole number of the primary winding, of a polyphase source of electric energy having an independent circuit for each pair of primary winding circuits, means for connecting said primary winding to said source of energy so as to produce either pole number of the primary winding, a resistance, and means for connecting said resistance to the secondary winding when the primary winding is connected to produce that number of primary magnetic poles for which the group circuits of the secondary winding are arranged in parallel relation.

22. The combination with an induction motor having a polyphase primary winding adapted to be connected to produce primary magnetic fields of two different pole numbers and a secondary winding, each of said windings comprising a plurality of circuits each of which contains conductors undergoing the same electrical change when the primary winding is changed from one pole number to the other, said primary winding having a neutral to which one terminal of each circuit thereof is permanently connected, the circuits of said secondary winding being permanently interconnected so that polyphase electric energy can be taken from the terminals thereof for one pole number of the primary winding and so as to form a locally short-circuited winding for the other pole number of the primary winding, of a polyphase source of electric energy having an independent circuit for each pair of circuits of the primary winding, and means for connecting the primary winding to said source of energy so as to produce either pole number thereof.

23. The combination with an induction motor having a quarter-phase primary winding adapted to be connected to produce primary magnetic fields of two different pole numbers and a secondary winding, each of said windings comprising eight circuits each of which contains conductors which carry current relatively in the same way when the primary winding is connected for either number of poles, said primary winding having a neutral to which one terminal of each circuit thereof is permanently connected whereby the winding has eight free terminals, each circuit of said secondary winding having one of its terminals permanently connected to a neutral to which some or all of the other secondary winding circuits also have one terminal thereof permanently connected whereby the secondary winding has eight free terminals, the free terminals of said secondary winding circuits being connected to form four groups in each of which the two circuits thereof are arranged in parallel relation for one pole number of the primary winding and in series relation for the other pole number of the primary winding, of a quarter-phase source of electric energy having two independent circuits per phase, and means for connecting the free terminals of said primary winding to said source of energy so as to produce either pole number of the primary winding.

24. The combination with an induction motor having a polyphase primary winding adapted to be connected to produce primary magnetic fields of two different pole numbers and a secondary winding, said primary winding comprising a plurality of circuits each of which contains conductors which carry current relatively in the same way when the primary winding is connected for either number of poles, said primary winding having a neutral to which one terminal of each circuit thereof is permanently connected whereby the primary winding has only as many free terminals as it has different circuits, said secondary winding being so connected that it is in effect open-circuited for one pole number of the primary winding and in effect short-circuited on itself for the other pole number of the primary winding, of a polyphase source of electric energy, means for connecting the free terminals of said primary winding to said source of energy so as to produce either pole number of the primary winding, a resistance, and means for connecting said resistance to the secondary winding when the primary winding is adapted to produce that number of primary magnetic poles for which the secondary winding is in effect open-circuited.

25. The combination with an induction motor having a quarter-phase primary winding adapted to be connected to produce primary magnetic fields of two different pole numbers and a secondary winding, said primary winding comprising eight circuits each of which contains conductors which carry current relatively in the same way when the primary winding is connected for either number of poles, said primary winding having a neutral to which one terminal of each circuit thereof is permanently connected whereby the primary winding has eight free terminals, said secondary winding being so connected that it is in effect open-circuited for one pole number of the primary winding and in effect short-circuited on itself for the other pole number of the primary winding, of a quarter-phase source of electric energy, means for connecting the free terminals of said primary winding to said source of energy so as to produce either pole number thereof, a resistance, and means for connecting said resistance to the secondary winding when the primary winding is connected to produce that number of primary magnetic poles for which the secondary winding is in effect open-circuited.

26. The combination with an induction motor having a polyphase primary winding adapted to be connected to produce primary magnetic fields of two different pole numbers, of a polyphase source of electric energy having a plurality of circuits adapted to be connected so as to supply electric energy at two different voltages, and means electrically associated with said primary winding and said source for connecting the primary winding to produce either pole number and for changing the voltage of the electric energy delivered by said source to said primary winding when the pole number of the primary winding is changed.

27. The combination with an induction motor having a polyphase primary winding adapted to be connected to produce primary magnetic fields of two different pole numbers, of a polyphase alternator having a plurality of circuits adapted to be connected so that the alternator can operate with either of two different characteristic curves, and means electrically associated with said primary winding and said alternator for connecting said primary winding to produce either pole number and for changing the characteristic curve of operation of said alternator when the pole number of the primary winding is changed.

28. The combination with an induction motor having means for producing primary magnetic fields of two different pole numbers, of a polyphase source of electric energy adapted to operate with two different electrical characteristics, and means electrically associated with said motor and said source for connecting the motor to said source to produce either number of primary magnetic poles and for changing the electrical operating characteristic of said source when the pole number of the primary magnetic field is changed.

29. The combination with an induction motor having means for producing polyphase primary magnetic fields of two different pole numbers, of a polyphase source of electric energy adapted to supply electric energy at two different voltages, and means electrically associated with said motor and said source for connecting the motor to the source so as to produce either pole number of the primary magnetic field and for changing the voltage of the electric energy delivered by the source to the motor when the pole number of the primary magnetic field is changed.

30. The combination with an induction motor having a quarter-phase primary winding adapted to be connected to produce primary magnetic fields of two different pole numbers, of a quarter-phase alternating current generator having a plurality of armature circuits, means electrically associated with said primary winding and said source for connecting said primary winding to produce either pole number thereof, and means for changing the armature circuits of the generator so that its terminal voltage is varied in the ratio of 1 to $\sqrt{2}$ when the pole number of the primary winding is changed.

31. The combination with an induction motor having a polyphase primary winding adapted to be connected to produce primary magnetic fields of two different pole numbers, said primary winding comprising a plurality of circuits each of which contains coils which carry current relatively in the same way when the primary winding is connected for either number of poles, said primary winding having a neutral to which one terminal of each circuit thereof is permanently connected, of a polyphase source of electric energy adapted to supply electric energy at two different voltages, means electrically associated with said primary winding and said source for connecting said primary winding to produce either pole number thereof, and means for changing the voltage of the electric energy delivered by said source to said primary winding when the pole number of the primary winding is changed.

32. The combination with an induction motor having a quarter-phase primary winding adapted to be connected to produce primary magnetic fields of two different pole numbers, said primary winding comprising eight circuits each of which contains conductors which carry current relatively in the same way when the primary winding is connected for either number of poles, said primary winding having a neutral to which one terminal of each circuit thereof is permanently connected whereby the primary winding has eight free terminals, of a quarter-phase alternating current generator having a plurality of armature circuits, means electrically associated with said primary winding and said source for connecting said primary winding to produce either pole number thereof, and means for changing the armature circuits of the generator so that its terminal voltage is varied when the pole number of the primary winding is changed.

33. The combination with an induction motor having a polyphase primary winding adapted to be connected to produce primary magnetic fields of two different pole numbers and a secondary winding, said secondary winding being so connected that it is in effect open-circuited for the higher pole number of the primary winding and in effect short-circuited on itself for the lower pole number of the primary winding, of a polyphase source of electric energy adapted to supply electric energy at two different voltages, means electrically associated with said primary winding and said source for connecting said primary winding to produce either pole number thereof, means for changing the voltage of the electric energy delivered by said source to said primary winding when the pole number of the primary winding is changed so that electric energy of relatively low voltage is delivered to said primary winding when the primary winding is connected to produce its higher number of poles, a resistance, and means for connecting said resistance to said secondary winding when the primary winding is connected to produce its higher number of poles.

In witness whereof, I have hereunto set my hand this 16th day of December, 1915.

ERNST F. W. ALEXANDERSON.